US010678825B2

(12) United States Patent
Elbaz (10) Patent No.: US 10,678,825 B2
(45) Date of Patent: Jun. 9, 2020

(54) PROCESSES AND SYSTEMS FOR COLLABORATIVE MANIPULATION OF DATA

(71) Applicant: FACTUAL INC., Los Angeles, CA (US)

(72) Inventor: Gil Elbaz, Los Angeles, CA (US)

(73) Assignee: FACTUAL INC., Los Angelos, CA (US)

( * ) Notice: Subject to any disclaimer, the term of this patent is extended or adjusted under 35 U.S.C. 154(b) by 0 days.

(21) Appl. No.: 14/622,575

(22) Filed: Feb. 13, 2015

(65) Prior Publication Data

US 2015/0161250 A1 Jun. 11, 2015

Related U.S. Application Data

(63) Continuation of application No. 12/559,702, filed on Sep. 15, 2009, now Pat. No. 8,959,070.

(51) Int. Cl.
*G06F 16/34* (2019.01)
*G06F 16/248* (2019.01)
*G06Q 10/10* (2012.01)
*G06F 16/25* (2019.01)
*H04L 29/06* (2006.01)

(52) U.S. Cl.
CPC .......... *G06F 16/345* (2019.01); *G06F 16/248* (2019.01); *G06F 16/252* (2019.01); *G06Q 10/101* (2013.01); *H04L 67/42* (2013.01)

(58) Field of Classification Search
CPC ......... G06F 17/30554; G06F 17/30997; G06F 16/345; G06F 16/248
USPC ....................................................... 707/705
See application file for complete search history.

(56) References Cited

U.S. PATENT DOCUMENTS

| | | | |
|---|---|---|---|
| 5,504,890 A | 4/1996 | Sanford | |
| 5,983,214 A | 11/1999 | Lang et al. | |
| 6,029,161 A | 2/2000 | Lang et al. | |
| 2001/0000536 A1* | 4/2001 | Tarin | 707/102 |
| 2005/0114449 A1* | 5/2005 | Verhaeghe et al. | 709/204 |
| 2005/0149259 A1 | 7/2005 | Cherveny et al. | |
| 2005/0203966 A1* | 9/2005 | Labrou et al. | 707/202 |
| 2008/0059390 A1* | 3/2008 | Cox et al. | 706/12 |
| 2008/0270363 A1* | 10/2008 | Hunt et al. | 707/3 |

(Continued)

FOREIGN PATENT DOCUMENTS

CN 1556482 A 12/2004

OTHER PUBLICATIONS

Wal Ton, et al., "03: A Collaborative Infrastructure for Aerospace Design", NASA Ames Research Center, Technical Report 00000049, http://home.central.net/-refilman/text/darwin/ace.pdf, and htto://oortal.acm.ora/beta/citation.cfm?id=891172, 2001 (7 oaaes).

(Continued)

*Primary Examiner* — Joshua Bullock
(74) *Attorney, Agent, or Firm* — Winston & Strawn LLP (57) ABSTRACT

Processes and systems are disclosed for accessing and providing information obtained from a source. The processes and systems allow for accessing data stored in an electronic storage medium and providing a first set of information derived from the data stored in the storage medium. The processes and systems also provide a second set of information comprising detail data underlying the summary data.

20 Claims, 4 Drawing Sheets

(56) References Cited

U.S. PATENT DOCUMENTS

2009/0281978 A1* 11/2009 Gordon et al. ................ 706/52
2010/0023469 A1* 1/2010 Farnham ........................ 706/46

OTHER PUBLICATIONS

International Search Report and Written Opinion issued for PCT/US10/48936, dated Nov. 2, 2010 (15 paqes).

* cited by examiner

PROCESSES AND SYSTEMS FOR COLLABORATIVE MANIPULATION OF DATA

FIELD OF THE INVENTION

The present invention relates generally to the field of database systems. More specifically, the present invention pertains to processes and systems for collaborative manipulation of data.

BACKGROUND

Database-driven applications on the web are organized such that a user is allowed to request and receive information stored in a database over a network. Information is provided from a database, typically through an application server, to the client application (e.g., browser). However, the databases underlying such applications do not guarantee the availability of detailed data underlying each cell of data which provides a complete story of how a particular value was derived. In addition, present databases do not have the native ability to deal with unreliability or uncertainty of information. These databases cannot take into account the variability of information sources and reputations. Accordingly, there remains a need for a database solution which hosts the raw data underlying the information used directly by applications, and also manages the complexities therein, for example, by crystallizing the set of data underlying each cell down to summarized, easy-to-use data point. In addition, there remains a need to allow users to view and access information relating to the reliability of such information and to contribute additional knowledge to improve upon it.

SUMMARY OF THE INVENTION

The disclosed processes and systems are based, in part, on enabling viewing of data and collaborative manipulation of a database by users. The processes and systems allow for a user to view a set of data cells, to explore all available detailed data submissions underlying the given data cells, and to submit new input knowledge to be used for subsequent processing. For example, a user can view an alleged fact that a person was born on a particular date. The user can readily view attributes of such information, for example, whether any consensus has formed around the summary value. Such information regarding the level of agreement surrounding a particular fact can provide the user with the motivation to suggest their opinions as to the true value. The user can then optionally access and view underlying detailed information about sources or users that agree or disagree with the given information. Such detailed information can provide a reference for illuminating the truth based on provided citations, reputation of users, or reference to calculation methods. Any new information submitted by a user is then processed along with historical data submissions for the given cell in order to compute a new summarized data point as well as related attributes, such as a new level of consensus. The disclosed process and systems allow for more information to be provided to a user than prior art systems and provide the user with greater opportunity to manipulate or comment on data found in one or more databases. The manipulated data and associated information can be viewed by other users, providing for collaboratively maintained databases that automatically surface that most accurate information along with attributes of the information stored therein. In certain additional embodiments, accessing data stored in an electronic storage medium is in response to a request from a user. In further embodiments, the process for accessing and providing information is in response to an input from a user.

In certain aspects, a process for accessing and providing information obtained from a source is provided. The process comprises accessing data stored in an electronic storage medium. The process also comprises, responsive to an input, providing a first set of information, the first set of information derived from the data stored in the storage medium and comprising summary data and attributes of the summary data. In addition, the process comprises, responsive to an input, providing a second set of information comprising detail data underlying the summary data. In particular embodiments, the process is performed using computer-executable code located on memories stored on servers.

In certain embodiments, the detail data includes associated metadata. In other embodiments, the data is stored in an electronic database. In still other embodiments, the first set of information is transmitted for display on a display device. In yet other embodiments, the second set of information is transmitted for display on a display device.

In particular embodiments, the attributes include the reliability or accuracy of the summary data. In still more particular embodiments, the attributes include the degree of consensus or contentiousness regarding the summary data. Certain embodiments of the processes disclosed herein further comprise receiving into the electronic storage medium additional data comprising detail data and including the additional data in the second set of information and in a subsequent computation of the first set of information.

In certain embodiments, the data stored in the electronic medium is organized into one or more data cells, and the first set of information is derived from the data that is summarized in each cell as a function of the detail data stored within each cell. In other embodiments, cells contain data which represent attributes of other cells. In certain other embodiments, one or more cells are organized as a tuple or row. In particular embodiments, one or more cells represent a primary key of the tuple or row, and other cells represent attributes of the primary key. In certain embodiments, rows are further organized into a 2-dimensional relational database table structure.

Yet further embodiments comprise receiving into the storage medium, a submission of data, adding the submission to the second set of information, and re-summarizing the first set of information in response to the submission of data.

In certain embodiments, a primary key is a system generated surrogate or identity key. In more embodiments, a primary key is automatically computed as a set of columns necessary to ensure uniqueness.

In certain embodiments, the type of data contained in a cell comprises alphanumeric string, integer, decimal, floating point, date, time, binary, or boolean. In other embodiments, the type of data comprises array, associative array, hash table, tree or data-interchange formats such as json or XML.

In yet more embodiments, the attributes of the summary data comprise information confidence, consensus, or certainty ratings relating to the likelihood that a certain value is correct. In particular embodiments, the confidence, consensus, or certainty of the summary data is indicated with a color or icon. In more particular embodiments, the attributes of the summary data is based on a function of the underlying detail data comprising mode, average, median, standard deviation, variance, or the most recent data submission. In still more particular embodiments, the attributes of the summary data comprises a representation of the distribution of opinions about the cell.

In certain embodiments, summary data comprises a representation of user submission and the consistency between summary data and user submission. In other embodiments, an aggregation algorithm determines summarized data using criteria, rules, logic, and data. In still other embodiments, criteria comprise any metadata associated with user submissions. In further embodiments, the metadata comprises user's confidence in the accuracy of the data value submitted.

In more embodiments, the metadata comprises ratings of trustworthiness of sources. In still more embodiments, the metadata comprises ratings of trustworthiness or reputation of users interacting with the cell. In particular embodiments, the metadata comprises date and time of submission of the user submitted data.

In some embodiments, de-weighting of a user submission is performed and is based on indications of lack of independence. In other embodiments, de-weighting prior submissions from a single user is performed, and more weight is given to updated submissions. In still other embodiments, de-weighting submissions is based on unverified citations.

In certain embodiments, a reputation algorithm determines the reputation or trustworthiness of the user, the reputation algorithm being based on criteria comprising user's reputation ratings, profile information, history of data submissions, predictive ability, social network connections, and IP address. In more embodiments, the underlying detail data is viewed with a folded or grouped view. In more embodiments, the underlying detail data is viewed in full with a raw detail data view.

In certain embodiments, the folded view displays one or more of the range of user submissions, the number of submissions, and the confidence, consensus, or certainty ratings associated with likelihood of correctness for each value.

In particular embodiments, the raw detail data view comprises additional metadata for each source and comments for each user submission. In more particular embodiments, the raw detail data view groups data by user or period of time.

In other embodiments, the data submission is accomplished within a detail data view by agreeing or disagreeing with a historical data submission. In still other embodiments, the user submits additional metadata fields. In still further embodiments, the metadata comprises a confidence level representing the confidence of the user in the given data submission representing the user's belief around the likelihood of that data being correct. In more embodiments, the metadata comprises the source or citation. In yet additional embodiments, the metadata comprises comments.

In still more embodiments, the submission is passive and by nature of an interaction that is not an active submission of new data. In yet more embodiments, the interaction is where a user views data, the user does not correct or modify the data, and the system determines that there is a higher likelihood that the user agreed with the data than disagreed with the data. In other embodiments, the user submission is through an API call.

In additional aspects, a collaborative data collection system is disclosed. The system comprises an input logic for processing a command provided by a user to retrieve, view, manipulate, and/or browse data stored in a database, the database being comprised of one or more cells containing data, the data comprising summary data, metadata, detail data and computed attributes of the data. The systems comprise access logic responsive to an input for accessing and retrieving data stored in one or more cells in the database and display logic for providing to a user the data retrieved from one or more databases, the display module further being configured to display one or more attributes of the data. The systems further comprise summarization logic for analyzing a set of underlying detail data points within each cell, and generating summary data. In certain embodiments, all of the logics comprising executable code, the executable code being stored on one or more memory devices.

In certain aspects, the systems further comprise database logic for storing the one or more databases and data.

In particular embodiments, the cells contain data which represent attributes of other cells. In more particular embodiments, one or more cells are organized as a tuple or row. In still more particular embodiments, one or more cells represent a primary key of the tuple or row, and other cells represent attributes of the primary key. In even more particular embodiments, rows are further organized into a 2-dimensional relational database table structure.

In certain embodiments, a default primary key is a system generated surrogate or identity key. In other certain embodiments, a primary key is automatically computed as a set of columns necessary to ensure uniqueness.

In certain embodiments, the type of data contained in a cell comprises alphanumeric string, integer, decimal, floating point, date, time, binary, or boolean. In certain other embodiments, the type of data comprises array, associative array, hash table, tree or data-interchange formats such as json or XML.

In particular embodiments, the attributes of the summary data comprise information confidence, consensus, or certainty ratings relating to the likelihood that a certain value is accurate. In more particular embodiments, the confidence of the summary data is indicated with a color or icon. In still more particular embodiments, the attributes of the summary data is based on a function of the underlying detail data comprising mode, average, median, standard deviation, variance, or the most recent data submission. In even more particular embodiments, the attributes of the summary data comprises a representation of the distribution of opinions about the cell.

In some embodiments, summary data comprises a representation of user submission and the consistency between summary data and user submission. In other embodiments, an aggregation logic determines summarized data using criteria, rules, logic, and data.

In certain embodiments, criteria comprise any metadata associated with user submissions. In more embodiments, metadata comprises user's confidence in the accuracy of the data value submitted. In even more embodiments, metadata comprises ratings of trustworthiness of sources or citations. In yet more embodiments, metadata comprises ratings of trustworthiness or reputation of users interacting with the cell.

In certain embodiments, metadata comprises date and time of submission of the user submitted data. Certain embodiments include systems that further comprise logic for de-weighting user submission based on indications of lack of independence. Other embodiments include systems that further comprise logic for de-weighting prior submissions from a single user, giving more weight to updated submissions. Still other embodiments include systems that further comprise logic for de-weighting submissions based on unverified citations.

In certain embodiments, a reputation algorithm determines the reputation or trustworthiness of the user, the reputation algorithm being based on criteria comprising user reputation rating, profile information, history of data submissions, predictive ability of user, social network connections, and IP address. In other embodiments, the underlying detail data is viewed with a folded view. In still other embodiments, the underlying detail data is viewed in a raw detail data view. In more embodiments, the folded view displays one or more of the range of use submissions, the number of submissions, and the confidence, consensus, or certainty ratings associated with likelihood of correctness for each value.

In certain embodiments, the raw detail data view comprises additional metadata for each source and comments for each user submission. In more embodiments, the raw detail data view groups data by data value submitted, user, citation, or submission time. In still more embodiments, the input logic receives a submission of data that is accomplished at a detail data view by agreeing or disagreeing with historical votes.

In further embodiments, logic allows the user submits additional metadata fields. In still further embodiments, the metadata comprises a confidence level representing estimated likelihood of data being accurate. Embodiments of the systems disclosed herein include metadata that comprises a data regarding a source or citation.

In certain embodiments, metadata comprises comments. In certain other embodiments, the interaction is where a user views data, the user does not correct or modify the data, and the system determines that there is a higher likelihood that the user agreed with the data than disagreed with the data.

Embodiments of the systems disclosed herein also include instances in which the submission is passive and by nature of an interaction that is not an active submission of new data. Certain embodiments of the systems further comprise logic, based on a user who views but does not correct data, for calculating the likelihood that the user agreed with the data. In particular embodiments, the user submission is through an API call.

BRIEF DESCRIPTION OF THE FIGURES

The foregoing and other objects of the disclosed processes and systems, the various features thereof, may be more fully understood from the following description, when read together with the accompanying drawings in which:

FIG. 4 is a pictorial representation of a view of summary data provided when the user accesses data in the database.

DETAILED DESCRIPTION OF THE INVENTION

Patent and scientific literature referred to herein establishes the knowledge that is available to those of ordinary skill in the art. The issued patents, published applications, published foreign applications, and references that are cited herein are hereby incorporated by reference to the same extent as if each was specifically and individually indicated to be incorporated by reference.

The present processes and systems will now be described more fully with reference to the accompanying drawings, in which preferred embodiments of the invention are shown. The processes and systems described herein may, however, be embodied in many different forms and should not be construed as being limited to the embodiments set forth herein.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present processes and systems disclosed herein are directed to enabling a user to view a summarized data view, to explore all available data underlying a given value, and to submit new knowledge to be used for subsequent processing. In one aspect, a process for data viewing and collaborative manipulation is disclosed. The process comprises accessing data stored in one or more cells of a database. The data is comprised of summary data, metadata, or detail data. The process further entails displaying a first summary view of summary data, the first view providing a user with summary data as well as information regarding attributes of the displayed summary data. In certain embodiments, the process allows for retrieving and displaying metadata or underlying detail data associated with the summary data, as well as enabling the user to manipulate data by storing new data in the database as underlying detail data in one or more cells for subsequent summarization, retrieval and viewing by the same or other users of the database.

In addition, aspects of the systems disclosed herein include a system for collaborative data collection. The system comprises input logic for processing a command provided by a user to retrieve, view, and/or manipulate data stored in a database. Typically, the database comprises one or more cells containing data, the data comprising summary data, metadata, and detail data associated with the summary data. The system further comprises access logic responsive to an input for retrieving data stored in one or more cells in the database and display logic for displaying the data retrieved from one or more databases. The display logic is further configured to display one or more attributes of the data. In some embodiments, the system includes database logic for storing any submissions or manipulations of data, as well as summarization logic for computing summarized data points and related attributes given the set of raw underlying detail data points. The system also comprises logics comprised of executable code, which is stored on one or more memory devices.

As used herein, the term "data" means any information or units of information representing qualitative or quantitative characteristics of a value or set of values. Data can be unique pieces of information stored or used in formats such as string, integer, decimal, floating point, date, time, binary, or boolean. In certain instances, data can be organized in more complex structures such as arrays, associative arrays, hash tables, or trees or data-interchange formats such as JXML or JSON. Metadata commonly means data about data. Typically, metadata is data that relates to other bits of data and describes the other data or provides information about the other data. As used herein, "detail data" means underlying raw data that provides justification and was used as a basis for computing summarized data for each individual cell. In addition, the term "summary data" refers to a set of summarized data points within cells that were generated based on a computation on a collection of raw detailed data underlying each cell. In particular embodiments, the term "summary data" is useful as a label in the context of "detail data" that was used to algorithmically determine the summary data. Methods for calculating summary data from detail data are shown in more detail below.

As used herein, the term "cell" means a location for a unit of information. Furthermore, by "database" is meant a collection of information or data stored in a system. Databases are typically organized based on a database model. For instance, common database models include row-based, column-based, hierarchical, relational, object-oriented and network models. These models require an explicit representation of data relationships.

Figure 1:
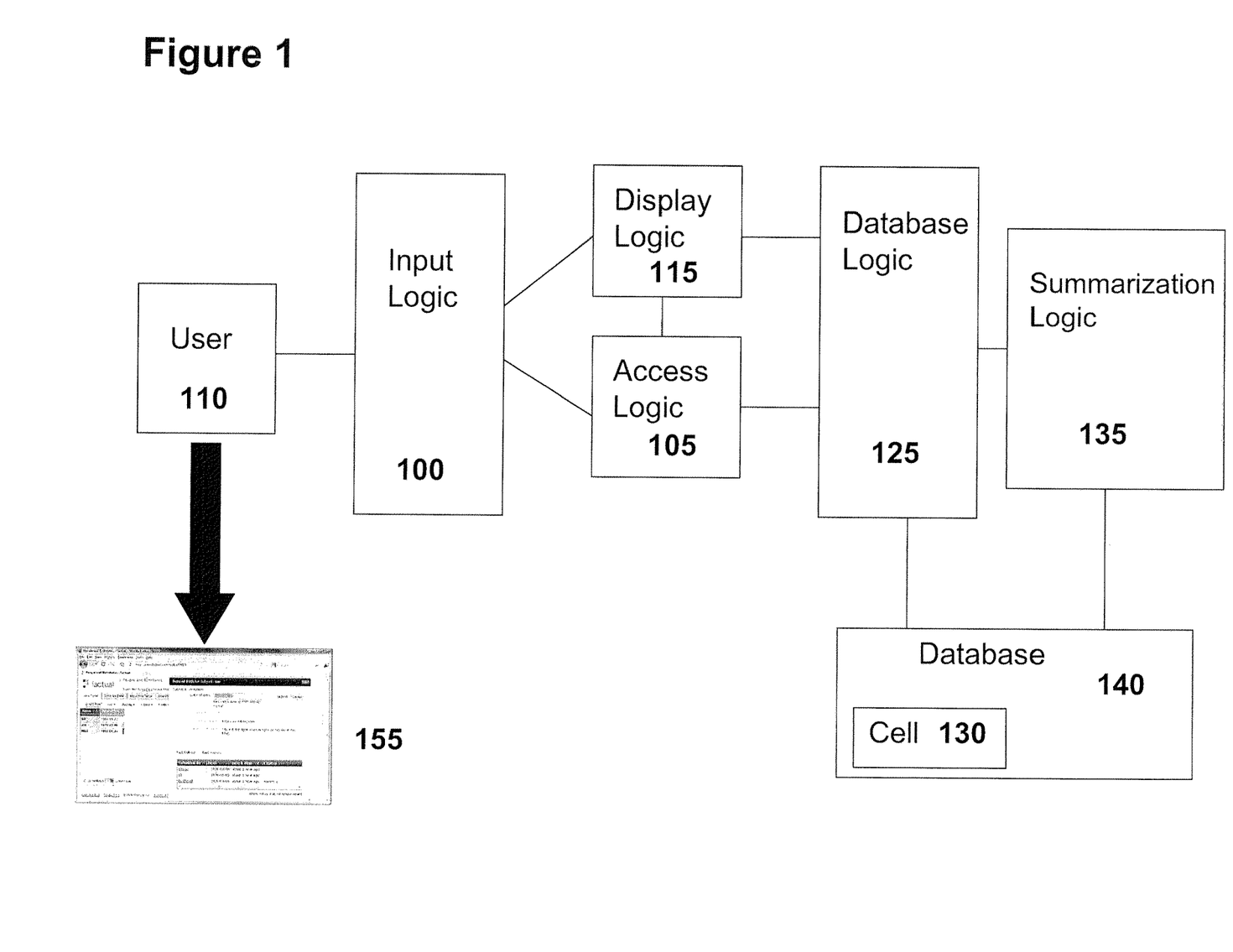
FIG. 1 is a schematic representation of a system for displaying and viewing data from a collective database.

FIG. 1 is a diagram depicting a particular embodiment disclosed herein. FIG. 1 shows a collaborative data collection system, which includes input logic 100 that receives inputs from a user 110. Input logic 100 processes a command provided by (or received from) a user to retrieve, view, and/or manipulate data stored in one or more databases stored by database logic 125. The input logic 100 enables the user to interact with the access logic 105 and display logic 115. Note that the user can access the system from any device that allows for wireless or landline access to a network or the internet. For example, the user device could be a computer, cell phone, or handheld computer device, such as a PDA.

The input logic 100 allows the user to interact with the access logic 105. The access logic 105 is responsive to an input. The user 110 provides a command to the input logic 100 for retrieving summary data stored in one or more cells 130 in the database 140. The access logic 105 requests data via database logic 125 which retrieves user's requested data. The user 110 can also provide commands to the input logic 100 so as to display the data retrieved from the database 140 utilizing display logic 115. The display logic 115 provides to a user the data that has been retrieved, thereby allowing the user to view the data and attributes of the data. As used herein, the term "attribute" means a quality of the data such as the levels of consensus, uncertainty, reliability, correctness, and/or confidence relating to the data. For example, one simplistic measure of the confidence and/or reliability of the data can be determined by comparing the number of data points that "agree" with a certain fact (e.g., value) versus the number of data points that "disagree" with a certain fact (e.g., value).

Figure 2:
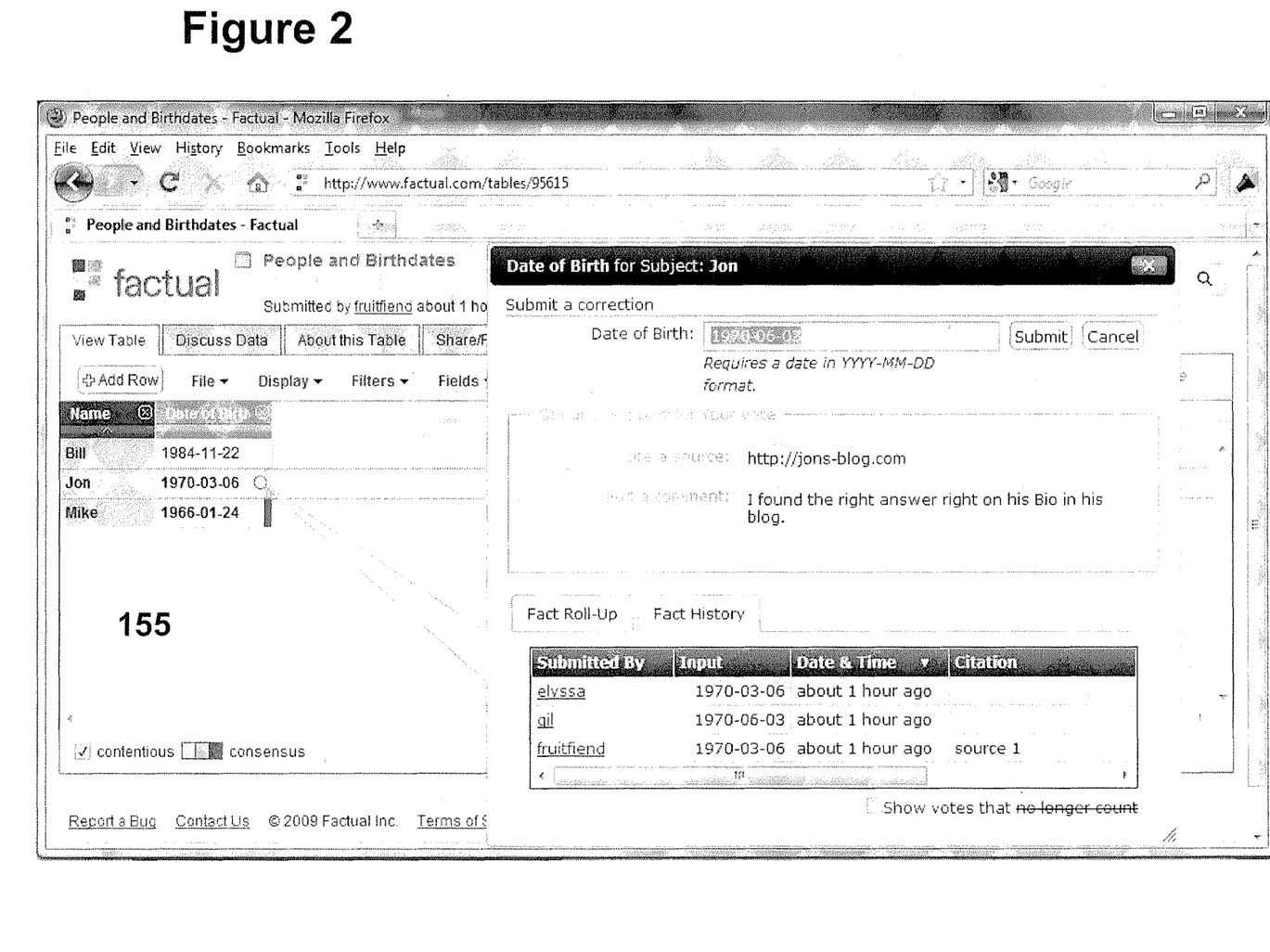
FIG. 2 is a pictorial representation showing a view of summary and detail data provided when a user accesses data in the database.

By way of example in FIG. 1 and FIG. 2, a user accesses a table 155 relating to the birth dates of various individuals. The table has a field <name> and a field <birthdate>. For <Jon>, the value for <birthdate> is "3/6/70". One of several shortcomings associated with prior database technologies was the inability of a user to determine the reliability of a particular fact or piece of data ("summary data"). Though this summary data is based on database updates representing submissions of knowledge relating to the particular piece of information, typically the database platform cannot provide a historical "trace" explaining why this information is being displayed. For example, what processes or set of users had a hand in inputting data that ultimately resulted in the currently available data, and based on what sources, references, processes, algorithms, motivations or directives?

Also, typically, the platform can not effectively engage new users who disagree with the information unless a database administrator specifically provides for such privilege.

In this example, a user could drill down and find out that the summary birthdate data was based on 2 users citing "3/6/70" and 3rd user citing "6/3/70" along with references to citations. This information represents the "detail data" underlying the summarized data point. In this example, a user was mistaken and data was entered incorrectly. Using a very simple predictive model of the true value based on popular input, it's more likely that the "3/6/70" value is correct. However, a new user may choose to do independent research and find that in fact, that the 2 users who entered "3/6/70" cited a source that listed "June 3rd, 1970" as the birthdate. The new user can now submit new knowledge and citation with the expectation that consensus will form around the accurate summary data value of "6/3/70".

In this non-limiting example, the table is color-coded to show whether there is uncertainty associated with this particular fact. The birth date for Jon is yellow, indicating that there is significant uncertainty or disagreement associated with the value. Of course, other colors, icons or visual representations can be chosen to show uncertainty.

Returning to FIG. 1, upon viewing the summary data, the user 110 inputs a command to the input logic 100 requesting detail data. The access logic 105 requests all available detail data relating to Jon's birth date, and the request is forwarded to database logic 125. As used herein, the term "detail data" refers to user submissions of facts, values, or data relating to particular data cells. The display logic 115 displays the detail data to the user. Here, the user views all historical data submissions including entries by other users. The user 110 can submit a new data value and inputs a command via the access logic 105 which sends a request to database logic 135 to store the new submission in the database 140. The database logic 125 also activates summarization logic 135 which computes a new summary value and attributes relating to Jon's birthdate, which are then also stored by database logic 125. The display logic 115 shows a new summarized value for Jon's birthdate and shows that the value relating to Jon's birth date has more agreement or certainty.

In certain embodiments, the data is viewed on a user display as a folded view. As used herein, the term "folded view" refers to a view of all underlying detail data submissions grouped by a particular field. As an example, there might be 10 underlying data submissions, but a detailed view folded on unique value would display only 2 records because the only unique values were "3/6/70" and "6/3/70". In certain embodiments, the folded view displays the unique user submitted data values, the number of submissions, and the confidence, consensus, or reliability ratings descriptive of the predicted correctness for the each unique data value. Such a view can be hidden from the user or displayed at the request of the user.

In certain embodiments, the "summary data view" shows a value computed from underlying "detail data" in which the value is the one that is most represented in the underlying detail data (i.e., received the most submissions). In other embodiments, the value shown in the "summary data view" is the one that is most recently received or is most recently submitted by a user. Yet in other embodiments, additional factors or weightings are applied in determination of the summary value such as the reputation of each user that contributed data.

Embodiments of the present invention are built upon logics comprised of executable code. The executable codes can be stored on one or more memory devices. Accordingly, a logic does not have to be located on a particular device. In addition, a logic can be multiple executable codes located on one or more devices in the systems disclosed herein. For instance, access logic responsive to an input for accessing and retrieving data stored in one or more cells in the database can be one executable code on an application server. In alternative embodiments, such access logic is found on one or more application servers. In still other embodiments, such access logic is found on one or more application servers and other devices in the system, including, but not limited to, "gateway" summary data servers and back-end data servers. The other logics disclosed herein also can be one or more executable code located on one or more devices within a collaborative data system.

In certain embodiments, the disclosed systems comprise one or more application servers, as well as one or more summary data servers, and one or more back-end data servers. The servers comprise memory to store the logics disclosed herein. In particular embodiments, the one or more application servers store the logics necessary to perform the tasks disclosed herein. In other embodiments, the summary servers store the logics necessary to perform the tasks disclosed herein. In other embodiments, the back-end servers store the logics necessary to perform the tasks disclosed herein.

In certain embodiments, the client web browser makes requests to the one or more application servers. Alternatively, the disclosed systems comprise one or more summary or back-end data servers to which the client web browser makes requests.

In an exemplary embodiment, the one or more application servers receive requests from the client web browser for specific data or tables. Upon these requests, the one or more application servers calls upon one or more database servers to request summary or detail data from cells or tables. The one or more application servers also call upon the one or more database servers when a request to submit new data inputs is made. The one or more application servers receive the data from the one or more summary servers and the one or more application servers generate HTML and JavaScript objects to pass back to the client web browser. Alternatively, the one or more application servers generate XML or JSON to pass objects through an API.

In the present embodiment, the database servers are based on an architecture involving a cluster of summary data servers and a cluster of back-end data servers. Note, however, that a system could include a single summary server and back-end data server. In this embodiment, the array of summary data servers are utilized to request from back-end data servers, summary data and attributes of such summarized data points (confidence, counts, etc.). The array of summary servers also caches such summary data and summary attributes so that faster access to such summary data can be access without the need for an additional request to the back-end data server.

The present systems and processes rely on executable code (i.e., logic) stored on memory devices. Memory devices capable of storing logic are known in the art. Memory devices include storage media such as computer hard disks, redundant array of inexpensive disks ("RAID"), random access memory ("RAM"), and optical disk drives. Examples of generic memory devices are well known in the art (e.g., U.S. Pat. No. 7,552,368, describing conventional semiconductor memory devices and such disclosure being herein incorporated by reference).

Also disclosed herein are processes for data viewing and manipulation, which advantageously provide superior data viewing and manipulation as compared to prior art collaborative features. The disclosed processes differ from prior collaborative features for sharing and editing data within database-driven applications because such prior collaborative features were designed into the application layer or the client application. In such features, the database layer was just responsible for the storing and recalling of records. For instance, the functions in a traditional database were simply INSERT, DELETE, UPDATE and SELECT (retrieve). A 'cell' in a relational database stores a single value within a specified table, in a given field, for a specific row as defined by a unique value for the primary key. As an example, an Employee table might have a field 'phone number', and for a specific record with primary key, Name='John Doe', we might have Phone Number='310-555-1212'.

The prior art databases also contain additional information about the value '310-555-1212'. If the database has a transaction log it might have a historical record of who inserted or updated that cell. But, in such systems today, that transaction log does not represent real-time usable/actionable knowledge. Rather, it is used for other system-level functions such as replication, backup and recovery, distributed commit, transaction rollback, etc. Thus, the application developer does not actually have direct access to historical data. Given such limitations an application developer can design a specific database for recording historical submissions of phone numbers. A custom database can be designed to store Name, Effective Date, and Phone Number as well as metadata comprising such user, date, time, process, citation, comments and other related information. But, even in this case, such capabilities aren't designed as core to the database itself. The present processes and systems allow one to view and manipulate underlying data due to the novel features provided herein. In contrast to the prior art, the present systems and processes can also allow a database to store multiple entries (instead of a single entry) in a single cell for any particular value.

Figure 3:
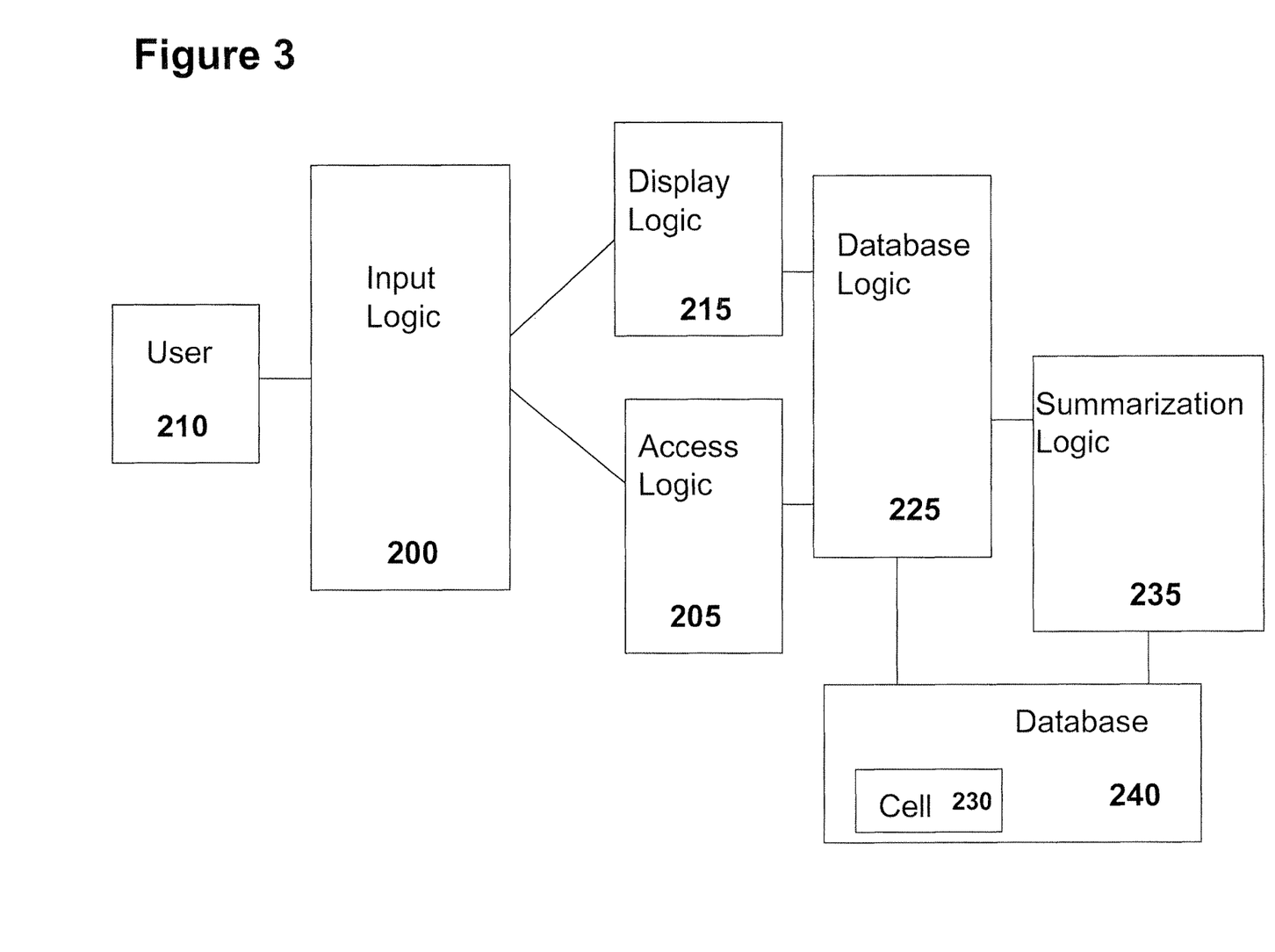
FIG. 3 is a schematic representation showing the process of data viewing and data manipulation.

The processes disclosed herein comprise accessing data stored in one or more cells of a database, data comprising summary data, metadata, or detail data. A first view of summary data is displayed, the first view providing a user with information. In certain embodiments, the information comprises the summarized data value as well as attributes of the displayed summary data or underlying detail data. The processes further entail retrieving and displaying underlying detail data which is associated with the summary data. The processes also enable the user to manipulate data by storing new data in the database as underlying detail data in one or more cells for later summarization, retrieval and viewing by the same or other users of the database. Referring to FIG. 3, an exemplary process for data viewing and manipulation is shown.

The following is a description of an exemplary process of data viewing and collaborative manipulation of data. FIG. 3 is a flow chart showing the steps of viewing and manipulating data in a database. User 210 inputs a command that is sent to an input logic 200. The input logic 200 accesses database 240 through an access logic 205. The access logic 205 is configured to access data via database logic 225 which retrieves data stored in one or more cells of the database 240. The database 240 itself is stored in a memory device. The data stored in the database 240 can comprise summary data, metadata, or detail data. The access logic 205 via the database logic 225 retrieves data from database 240 queried by user 210. Upon identifying and retrieving the queried data, the access logic 205 via the display logic 215 provides one or more views of data to a user 210. The user 210 can display and view the one or more first views 250. As described herein, the one or more first views provide the user 210 with summary data as well as attributes of the displayed summary data.

In the present example, the user 210 submits new data. While the new data may have the same value as the prior summary value, it is still considered new because it is a new submission of data with unique metadata. The user then stores the newly submitted data in the database via a command received by the input logic 200. The input logic 200 sends a transaction to access logic 205 which then forwards the transaction to database logic 225. The database logic 225 stores the modified data in the appropriate cell 230 in the database 240. FIG. 3 also shows certain embodiments in which the user 210 via the input logic 200 commands the access logic 205 and database logic 225 to browse and retrieve metadata and/or detail data associated with summary data. In these instances, the retrieved metadata and/or detail data are provided to the user 210 in the same way as retrieved summary data. As by FIG. 2, the system enables the user 210 to manipulate data in the database 240 and store user submissions in one or more cells of the database 240 for later re-summarization, retrieval and viewing by the same or other users of the database.

Embodiments of the processes and systems disclosed herein allow for a user to view data in different formats. In certain embodiments, a chart or table is viewed. The table can be comprised of cells grouped into columns and rows. Spreadsheets are examples of such a two-dimensional organization, and are well known in the art. An example of such a table is shown in FIG. 4. The table 300 is organized into vertical column(s) relating to the subject field 305 or primary key of each record, and vertical column(s) or attribute field(s) 315 relating to a particular attribute in which each cell within the column contains a fact 310 (i.e., value) about a subject 355. Each horizontal row 325 represents a tuple. In the present example, the left-most columns relate to information about restaurants. In column 335, the "child-friendliness" of the restaurant displays the summarized data values which have been computed based on historical data submissions by users. In this example, a user submits their knowledge of the "child-friendliness" of the restaurant as "no" for the Tanglewood restaurant. The user instructs the system to store this data in the database, and the system re-computes the summary data which is the most likely correct answer for "child-friendliness" for the particular restaurant.

The collaborative database disclosed herein enables the user to submit new data points underlying each cell. Generally, this data is hidden until a user requests the underlying detail data for viewing. This raw underlying detail data provided by all users, sometimes referred to as inputs, can be viewed. In FIG. 4, the "inputs" are "yes" and "no" submissions (i.e., inputs). When this data is hidden, the table is color-coded to indicate the reliability of the value shown for this attribute that is stored in the database. The color-coding indicates the amount of consensus or certainty regarding this attribute. For instance, if 50% of values are yes and 50% are no, there is a high level of disagreement and the value shown in the cell has low certainty. If all inputs were "no", then the color code would indicate that there is consensus and the data is probably uncertain. Color coding is merely an exemplary method of relaying reliability information to a user. One of ordinary skill in the art would understand that icons, border-shading, and other similar highlighting can be used to convey the levels of certainty, statistical significance, consensus, confidence, disagreement, or accuracy of the value presented in the table shown in FIG. 4.

As noted above, the user can view all of the raw underlying detail data submitted by any user. This information provides the user with a basis for understanding where the underlying data was obtained and how the summary data was computed. The summarization logic 235 takes various information into account when rating the levels of reliability, consensus, disagreement, accuracy, or confidence of the data. For instance, the database has logic that allows it to reduce the relevance or weighting of "inputs" obtained from users or groups who appear to be spammers or are otherwise predicted to be unreliable. So, in the present example, a user (i.e., spammer) provides multiple "yes" inputs over a specified period of time, potentially skewing the value in the table to "yes" and also affecting the reliability rating. On the one hand, the user can view this data, and take this into account when considering the value. On the other hand, the database will either filter or reduce the effect of the multiple inputs on the value and reliability presented in the chart. Other spam detection techniques are well known in the art.

In certain embodiments, the summarization logic 235 comprises logic for weighting or de-weighting individual data submissions based on a reputation algorithm which determines the reputation or trustworthiness of the user. The reputation algorithm, one such example described above, is based on criteria comprising user rating, user profile information, historical data submissions, historical predictive ability of user, social network connections, and IP address. Such logics and algorithms are useful for improving the accuracy and reliability of the summary data in the database.

In certain embodiments, the summarization logic 235 also has logic for de-weighting the value of a submission based on indications of lack of independence. Lack of independence is found, for example, when submissions all provide the same citation. In such cases, all related submissions are dependent on the particular source of the citation, and therefore an erroneous citation provided by multiple users effectively amplifies the effect of such an error. The database logic 225 can improve the accuracy of it's summarization by taking into account the linage of the underlying data submissions.

In certain embodiments, the summarization logic 235 comprises logic for de-weighting prior submissions from a single user, giving more weight to updated submissions. Such logic dilutes the power of a single user's ability to skew the summarization logic in favor In other embodiments, the summarization logic 235 comprises logic for de-weighting submissions based on unverifiable sources.

There are occasions when a user views data or otherwise interacts with the system, but does not submit data. In such instances, a "passive" submission of data can be the to have been made even though no data was actively submitted. In some embodiments, the system comprises logic for calculating the likelihood that the user agreed or disagreed with the data based on the specific interactions. In one example, the user views a data point but does not correct it, and the system can calculate that there is a slightly higher likelihood that the user agreed with the data than the likelihood that they disagreed with it. Such additional data can be utilized by summarization logic 235 in evaluating the correctness or reliability of the data.

Embodiments of the present processes and systems also envision a database in which cells of the database are organized into tuples or rows of data which are organized into tables. In many embodiments, one or more fields in a table comprises a primary key or subject. In many embodiments, one or more fields in a table represent attributes which provide information about the primary key or subject of each record or row. In certain embodiments, the primary key is determined (i.e., calculated) by identifying the minimum number of columns in a table, such as a two-dimensional table, that are required to ensure that the primary key is unique. In certain embodiments, the primary key is a surrogate key generated by the system.

Embodiments of the processes and systems disclosed herein also include logic for enabling a user to submit metadata associated with data submissions. For example, a user can submit a citation, comments, or confidence associated with the submitted data value. The submitted metadata is then stored as underlying detail data along with the submitted data value at the request of the user in memory devices via database logic.

The systems disclosed herein also comprise logic for recognizing an application program interface as a user. In fact, a user is any entity, person, interface, or group that can access a database by means such as the internet, a virtual private network, an intranet, or a network. The present systems can be used in any system that allows access to a database.

EQUIVALENTS

In the drawings and specification, there have been disclosed embodiments according to the invention and, although, specific terms are employed, they are used in a generic and descriptive sense only and not for purposes of limitation. As for the scope of the invention, it is to be set forth in the following claims. In addition, the figures disclosed herein should not be construed as limiting the scope of the claims set forth herein or limiting the scope of the invention to the organization set forth in the figures, as the are only demonstrative of exemplary embodiments of the invention. Therefore, it will be understood by those of ordinary skill in the art that various changes in form and details may be made therein without departing from the spirit and scope of the present invention as defined by the following claims.

I claim:

1. A process for accessing and providing information obtained from a source comprising:
    accessing values stored in an electronic storage medium;
    providing a first set of information derived from the values stored in the storage medium and comprising a summary value stored in a data cell and attributes of the summary value, and
    providing a second set of information comprising at least one detail value stored in the data cell and underlying the summary value, wherein the at least one detail value comprises a previous user-submitted entry for the summary value,
    wherein providing the first set of information derived from the values comprises selecting the summary value from the at least one detail value based on a summarization logic,
    wherein the attributes of the summary value comprise an indication of a measure of confidence in the summary value based at least in part on a proportion of a number of the at least one detail value which are consistent with the summary value, one or more information confidence, consensus, or certainty ratings relating to a likelihood that the summary value is correct, and a representation of a user submission and of consistency between the summary value and the user submission,
    wherein the summarization logic comprises logic for determining a likelihood of user agreement with the summary data based on the user's interaction with the summary data, the user visualizing but not correcting or modifying the summary data indicating a greater likelihood of user agreement with the summary data, and
    wherein a new entry for the summary value is received from a user submission and stored in the data cell as a detail value.

2. The process of claim 1, wherein the at least one detail value comprises associated metadata.

3. The process of claim 1, wherein the electronic storage medium comprises an electronic database.

4. The process of claim 1, wherein initiating presentation of a summary value comprises initiating display of the summary value on a display device.

5. The process of claim 1, wherein initiating presentation of the at least one detail value comprises initiating display of the at least one detail value on a display device.

6. The process of claim 1, wherein the attributes comprise a reliability or accuracy of the summary value.

7. The process of claim 1, wherein the attributes comprise a degree of consensus or contentiousness regarding the summary value.

8. The process of claim 1, further comprising determining the summary value based on criteria and rules.

9. The process of claim 8, wherein the criteria comprise ratings of trustworthiness of sources of the values.

10. A collaborative data collection system comprising a processor configured to acquire computer readable instructions stored in one or more memory, devices and execute the instructions comprising instructions to cause the system to:
    process values stored in an electronic storage medium;
    initiate presentation, in response to a first input, of one or more first items of information derived from the values, wherein the one or more first items of information comprise a summary value stored in a data cell and attributes of the summary value, and
    initiate presentation, in response to a second input, of one or more second items of information comprising at least one detail value stored in the data cell and corresponding to the summary value, wherein the at least one detail value comprises a previous user-submitted entry for the summary value,
    wherein the presentation, in response to a first input, of one or more first items of information derived from the values, comprises a selection of the summary value from the at least one detail value based on a summarization logic,
    wherein the attributes of the summary value comprise an indication of a measure of confidence in the summary value based at least in part on a proportion of a number of the at least one detail value which are consistent with the summary value, one or more information confidence, consensus, or certainty ratings relating to a likelihood that the summary value is correct, and a representation of a user submission and of consistency between the summary value and the user submission,
    wherein the summarization logic comprises logic for determining a likelihood of user agreement with the summary data based on the user's interaction with the summary data, the user visualizing but not correcting or modifying the summary data indicating a greater likelihood of user agreement with the summary data, and
    wherein a new entry for the summary value is received from a user submission and stored in the data cell as a detail value.

11. The collaborative data collection system of claim 10, wherein the at least one detail value comprises associated metadata.

12. The collaborative data collection system of claim 10, wherein initiating presentation of the one or more first items of information comprises initiating display of the one or more first items of information on a display device.

13. The collaborative data collection system of claim 10, wherein initiating presentation of the one or more second items of information comprises initiating display of the one or more second items of information on a display device.

14. The collaborative data collection system of claim 10, wherein the attributes comprise a reliability or accuracy of the summary value.

15. The collaborative data collection system of claim 10, wherein the processor is configured to execute the instructions comprising instructions to cause the apparatus to determine the summary value based on criteria and rules.

16. The collaborative data collection system of claim 15, wherein the criteria comprises ratings of trustworthiness of source of the value.

17. A collaborative data collection system, comprising:
means for processing values stored in an electronic storage medium;
means for initiating presentation, in response to a first input, of one or more first items of information derived from the values, wherein the one or more first items of information comprise a summary value stored in a data cell and attributes of the summary values; and
means for initiating presentation, in response to a second input, of one or more second items of information comprising at least one detail value stored in the data cell and corresponding to the summary value, wherein the at least detail value comprises a previous user-submitted entry for the summary value,
wherein the presentation, in response to a first input, of the one or more first items of information derived from the values comprises a selection of the summary value from the at least one detail value based on a summarization logic,
wherein the attributes of the summary value comprise an indication of a measure of confidence in the summary value based at least in part on a proportion of a number of the at least one detail value which are consistent with the summary value, one or more information confidence, consensus, or certainty ratings relating to a likelihood that the summary value is correct, and a representation of a user submission and of consistency between the summary value and the user submission,
wherein the summarization logic comprises logic for determining a likelihood of user agreement with the summary data based on the user's interaction with the summary data, the user visualizing but not correcting or modifying the summary data indicating a greater likelihood of user agreement with the summary data, and
wherein a new entry for the summary value is received from a user submission and stored in the data cell as a detail value.

18. The collaborative data collection system of claim 17, wherein the attributes comprise a reliability or accuracy of the summary value.

19. The collaborative data collection system of claim 17, wherein the attributes comprise a degree of consensus or contentiousness regarding the summary value.

20. The collaborative data collection system of claim 17, further comprising determining the summary value based on criteria and rules, wherein the criteria comprise ratings of trustworthiness of sources of the values.

* * * * *